(12) United States Patent
Zhao et al.

(10) Patent No.: US 11,544,067 B2
(45) Date of Patent: Jan. 3, 2023

(54) ACCELERATING AI TRAINING BY AN ALL-REDUCE PROCESS WITH COMPRESSION OVER A DISTRIBUTED SYSTEM

(71) Applicants: Baidu USA LLC, Sunnyvale, CA (US); Baidu.com Times Technology (Beijing) Co., Ltd., Beijing (CN); KUNLUNXIN TECHNOLOGY (BEIJING) COMPANY LIMITED, Beijing (CN)

(72) Inventors: Zhibiao Zhao, Cupertino, CA (US); Jian Ouyang, Beijing (CN); Hefei Zhu, Sunnyvale, CA (US); Qingshu Chen, Shanghai (CN); Wei Qi, Beijing (CN)

(73) Assignees: BAIDU USA LLC, Sunnyvale, CA (US); BAIDU.COM TIMES TECHNOLOGY (BEIJING) CO., LTD., Beijing (CN); KUNLUNXIN TECHNOLOGY (BEIJING) COMPANY LIMITED, Beijing (CN)

(*) Notice: Subject to any disclaimer, the term of this patent is extended or adjusted under 35 U.S.C. 154(b) by 123 days.

(21) Appl. No.: 16/607,087

(22) PCT Filed: Oct. 12, 2019

(86) PCT No.: PCT/CN2019/110814
§ 371 (c)(1),
(2) Date: Oct. 21, 2019

(87) PCT Pub. No.: WO2021/068243
PCT Pub. Date: Apr. 15, 2021

(65) Prior Publication Data
US 2021/0318878 A1     Oct. 14, 2021

(51) Int. Cl.
*G06F 9/38* (2018.01)
*G06N 3/08* (2006.01)
(Continued)

(52) U.S. Cl.
CPC ........ *G06F 9/3812* (2013.01); *G06F 9/30178* (2013.01); *G06F 9/3877* (2013.01); *G06F 15/8015* (2013.01); *G06N 3/08* (2013.01)

(58) Field of Classification Search
CPC ............................... G06F 9/3877; G06N 3/08
See application file for complete search history.

(56) References Cited

U.S. PATENT DOCUMENTS

| | | | |
|---|---|---|---|
| 2016/0321777 A1* | 11/2016 | Jin | G06F 9/52 |
| 2018/0026649 A1* | 1/2018 | Harik | G06N 3/0454 |
| | | | 707/693 |

(Continued)

FOREIGN PATENT DOCUMENTS

| | | |
|---|---|---|
| CN | 104899641 | 9/2015 |
| CN | 108229687 | 6/2018 |

(Continued)

OTHER PUBLICATIONS

Chahal et al, Ahitchiker's guide on distributed training of deep neural networks, Oct. 28, 2018, 14 pages, retrieved from the internet on Aug. 11, 2021, retrieved from URL <https://arxiv.org/pdf/1810.11787.pdf> (Year: 2018).*

(Continued)

*Primary Examiner* — Michael J Metzger
(74) *Attorney, Agent, or Firm* — Womble Bond Dickinson (US) LLP (57) ABSTRACT

According to various embodiments, methods and systems are provided to accelerate artificial intelligence (AI) model training with advanced interconnect communication technologies and systematic zero-value compression over a (Continued)

distributed training system. According to an exemplary method, during each iteration of a Scatter-Reduce process performed on a cluster of processors arranged in a logical ring to train a neural network model, a processor receives a compressed data block from a prior processor in the logical ring, performs an operation on the received compressed data block and a compressed data block generated on the processor to obtain a calculated data block, and sends the calculated data block to a following processor in the logical ring. A compressed data block calculated from corresponding data blocks from the processors can be identified on each processor and distributed to each other processor and decompressed therein for use in the AI model training.

16 Claims, 8 Drawing Sheets

(51) Int. Cl.
  *G06F 9/30* (2018.01)
  *G06F 15/80* (2006.01)

(56) References Cited

U.S. PATENT DOCUMENTS

| | | | |
|---|---|---|---|
| 2018/0204110 A1 | 7/2018 | Kim et al. | |
| 2018/0308256 A1 | 10/2018 | Appu et al. | |
| 2018/0357534 A1 | 12/2018 | Cho et al. | |
| 2019/0130272 A1* | 5/2019 | Yosinski | G06N 3/084 |
| 2019/0197420 A1 | 6/2019 | Singh et al. | |
| 2019/0205745 A1* | 7/2019 | Sridharan | G06F 9/5077 |
| 2019/0312772 A1 | 10/2019 | Zhao et al. | |
| 2020/0184368 A1* | 6/2020 | Duenner | G06F 9/5027 |
| 2020/0311539 A1* | 10/2020 | Cho | H03M 7/30 |

FOREIGN PATENT DOCUMENTS

| | | |
|---|---|---|
| CN | 109214512 | 1/2019 |
| CN | 110197275 | 9/2019 |
| EP | 3385901 A1 | 10/2018 |
| JP | 07084966 A | 3/1995 |
| WO | 2018184224 | 10/2018 |

OTHER PUBLICATIONS

Koenen et al, CCIX a new coherent multichip interconnect for accelerated use cases, 2017, ARM, 19 pages, [retrieved from the internet on Aug. 11, 2021], retrieved from URL <http://www.armtechforum.com.cn/attached/article/C7_CCIX20171226161955.pdf> (Year: 2017).*

Silva, Machine learning 101 An intuitive introduction to gradient descent, Mar. 6, 2018, 12 pages, [retrieved from the internet on Aug. 11, 2021], retrieved from URL <towardsdatascience.com/machine-learning-101-an-intuitive-introduction-to-gradient-descent-366b77b52645> (Year: 2018).*

Gibiansky Andrew: "Bringing HPC Techniques to Deep Learning—Andrew Gibiansky", • Feb. 21, 2017 (Feb. 21, 2017), Retrieved from the Internet: URL:https://andrew.gibiansky.com/blog/machine-learning/baidu-allreduce/ [retrieved on Feb. 23, 2021], 22 pages.

Patarasuk Pet Al: "Bandwidth optimal all-reduce algorithms for clusters of workstations", Journal of Parallel and Distributed Computing, Elsevier, Amsterdam, NL, vol. 69, No. 2, Feb. 1, 2009 (Feb. 1, 2009), pp. 117-124, [retrieved on Oct. 14, 2008], 8 Pages.

Alexander Sergeev et al: "Horovod: fast and easy distributed deep learning in Tensor Fl ow", arxiv.org, Cornell University Library, 201 Olin Library Cornell University Ithaca, NY 14853, Feb. 16, 2018 (Feb. 16, 2018), 10 pages.

Morgan N et al: "The Ring Array Processor: A Multiprocessing Peripheral for Connectionist Applications", Journal of Parallel and Distributed Computing, Elsevier, Amsterdam, NL, vol. 14, No. 3, Mar. 1, 1992 (Mar. 1, 1992), pp. 248-259, 12 pages.

Anonymous: "Instruction Pipelining—Wikipedia", Sep. 22, 2019, Last Modified Jan. 19, 2021, 8 pages.

David Koenen, Arm, "Cache Coherent Interface for Accelerators (CCIX)," SNIA Persistent Memory PM Summit, Jan. 24, 2018, San Jose, CA, 24 pages.

* cited by examiner

ACCELERATING AI TRAINING BY AN ALL-REDUCE PROCESS WITH COMPRESSION OVER A DISTRIBUTED SYSTEM

TECHNICAL FIELD

Embodiments of the present disclosure relate generally to machine learning. More particularly, embodiments of the disclosure relate to neural network training.

BACKGROUND

Neural networks are becoming increasingly complex in order to solve complex problems. Complex neural networks require complex deep learning algorithms and more data bandwidth during the training phase. As a result, training time, cost, and power consumption have increased. To accelerate training, advanced servers, for example, faster servers or server clusters with more sophisticated interface, have been used to improve computing and communications to reduce the cost of expensive hardware. However, existing solutions still present challenges in terms of performance and cost.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to various embodiments, methods and systems are provided herein to accelerate artificial intelligence (AI) training with advanced interconnect communication technologies. Utilizing both software and hardware components, embodiments described in the disclosure can significantly lower the interconnect communications bandwidth requirement, power consumption, and reduce the training time, thereby improving training performance without the penalty of precision loss. Systematic data compression and decompression are used over a distributed system for AI model training, coupled with the use of the highly efficient All-Reduce algorithm.

According to one embodiment, a computer-implemented method of AI model training includes the operations of performing multiple iterations in a Scatter-Reduce process on a cluster of processors, each of which can be a graphical processing unit (GPU). The processors can be arranged in a logical ring to train a neural network model, each processor including multiple data blocks, each data block representing a set of parameters or a set of gradients for updating a set of parameters in the neural network model.

During each iteration, a processor receives a compressed data block from a prior processor in the logical ring, performs an operation on the received compressed data block and a compressed data block generated on the processor to obtain a calculated data block, and sends the calculated data block to a following processor in the logical ring. By the end of the multiple iterations, each data block on the multiple processors would have been compressed and operated on. The method further includes the operation of identifying on each of the plurality of processors a compressed data block calculated from corresponding data blocks from the plurality of processors.

In one embodiment, the identified compressed data block can be distributed to each of the other processors in the logical ring, and can be decompressed on the processor for use in updating parameters in the neural network model. The processors can be attached to central processing units (CPUs) in different systems of the distributed AI model training system. In one embodiment, each processor can include a hardware-based or software-based compression module utilizing a zero-value compression technique to compress and decompress data blocks. A compressed data block can be represented by a data structure with a bitmask section and a compressed data section, and the bitmask includes bits indicating positions in the block of data that have non-zero values.

According to one embodiment, when a request for AI training is received from a central processing unit (CPU), each of the general-purpose processing units (GPUs) arranged in a logical ring is configured to perform data processing (DP) operations on the data blocks distributed from the CPU iteratively in a pipelined manner. Each GPU operates as a DP accelerator with respect to the CPU. For each iteration, during a first DP cycle, each GPU performs a first predetermined DP operation (e.g., data compression) on one of the data blocks respectively in parallel and generates a respective DP result. During a second DP cycle, each GPU transmits via a respective inter-processor link the respective DP result to a respective downstream GPU in the logical ring to be further processed therein. For the purpose of illustration, a GPU is utilized as an example of a DP accelerator, however, other types of processors or processing logic may be utilized as DP accelerators.

In one embodiment, during the second DP cycle, each GPU further receives a processing result from its respective upstream GPU in the logical ring via a respective inter-processor link for further processing at the GPU. In one embodiment, during a third DP cycle, each of the GPUs concurrently performs a second predetermined DP operation (e.g., a combine operation such as a summation) on a first data block processed by itself (e.g., a processing result) and a second data block received from its upstream GPU (e.g., a processing result by the upstream GPU). In one embodiment, during a fourth DP cycle, each of the GPUs performs a further DP operation such as a data decompression operation.

Figure 1:
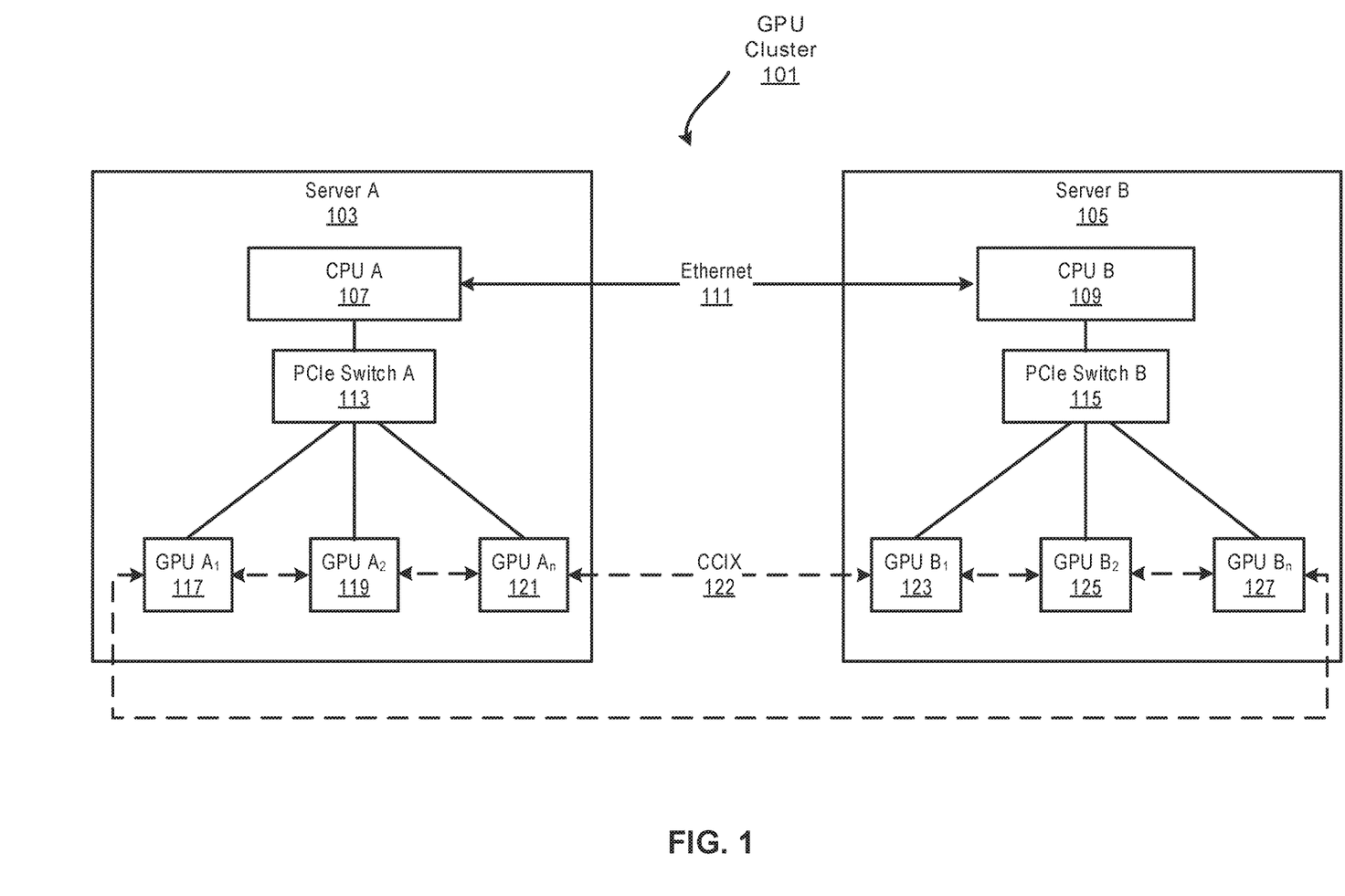
FIG. 1 illustrates an example of a system for use in AI model training in accordance with an embodiment.

FIG. 1 illustrates an example of a system for use in AI model training in accordance with an embodiment. As shown in FIG. 1, the system includes a cluster of GPUs 101 scattered in a number of servers, for example, server A 103 and server B 105, where each server includes one or more CPUs and each CPU is associated with one or more DP accelerators such as GPUs. The servers can include CPUs 107 and 109 that communicate with each other via an Ethernet connection 111. In the example system as shown in FIG. 1, each CPU can have a number of GPUs connected to the CPU via a PCIe (peripheral component interconnect express) switch. For example, in server A 103, the GPUs 117, 119 and 121 are connected to CPU A 107 via PCIe switch A 113; in server B 105, the GPUs 123, 125 and 127 are connected to s CPU B 109 via PCIe B 115.

The CPUs 107 and 109 can communicate with each other via an inter-processor link such as the Ethernet connection 111 to coordinate the task of training a neural network. For example, job commands can be distributed to each server via the Ethernet connection 111. A job command can then be dispatched from the CPU in the server to the GPUs connected to that CPU. Once the job command is dispatched, data among the GPUs in the system can be transferred via a respective inter-processor link or connection such as a Cache Coherent Interconnect for Accelerators (CCIX) compatible connection 122. As shown in FIG. 1, the GPUs in the system are arranged in a bi-directional ring topology although a uni-directional ring topology can be used.

CCIX is an open cache coherent interconnect architecture developed by the CCIX Consortium. CCIX is designed to simplify the communication between the central processor (e.g., CPU) and the various accelerators (e.g., GPU) in the system through a cache-coherent extension to standard PCIe. CCIX is a high-performance, chip-to-chip interconnect architecture that provides a cache coherent framework for heterogeneous system architectures. Cache coherency is automatically maintained at all time between the central processing unit and the various other accelerators in the system. Every CCIX-support device incorporates at least a single CCIX port which is pin-compatible with any other CCIX-enabled device. CCIX supports a large set of topologies such as chip-to-chip, chip-switch-chip, mesh, daisy chains, and rings.

In one embodiment, the GPUs are configured to perform AI training operations on data blocks distributed from their respective CPUs in a pipelined manner. Each of the GPUs also communicates with each other via an inter-processor link. The GPUs may be configured in a ring arrangement to receive a processing result of an upstream GPU for further data processing. Each GPU may further send a processing result to its corresponding downstream GPU to be further processed therein. Thus, each of the GPUs performs its assigned DP operation in parallel and sends its DP result to a downstream GPU. Meanwhile, each GPU further receives a processing result from its upstream GPU for further processing therein.

FIGS. 2A-2F illustrate an example process of data transfer in AI model training in accordance with an embodiment. Although three GPUs 203, 205 and 207 are shown herein, the example process can use as many as GPUs (e.g., thousands of GPUs) depending on a number of factors, for example, the complexity of the neural network to be trained, the size of the training data and the desired training speed of the user.

Examples of neural networks that can be trained on the example system include a multilayer perceptron (MLP) neural network, which includes a collection of connected neurons. The neurons in the MLP neural network can be fully connected, with each neuron in one layer connecting with parameters (e.g., weights and biases) to every neuron in the following layer.

During the training of a neural network model, gradient descent (i.e. backpropagation) can be used to determine a set of parameters that minimize the difference between expected values and actual output of the neural network model. The gradient descent includes the steps of calculating gradients of the loss/error function, and updating existing parameters in response to the gradients. The cycle can be repeated until the minima of the loss function are reached.

In one embodiment, a training dataset for the neutral network model can be divided into multiple of subsets, with each subset used for training the neural network model on one of the GPUs, such that the training of the neural network can be conducted in parallel by the multiple GPUs. Each GPUs can have a complete copy of the neural network model.

Each subset of the training dataset can be logically divided into multiple of equal-sized chunks of data. The number of the chunks may be equal to the number of the GPUs in the example process. The parallelizing training of the neural network model need multiple iterations for the gradient descent. For each iteration, every GPU runs forward propagation of the neural network model on the data on that GPU, followed by error backpropagation to compute the gradient of the loss with respect to the network parameters. The GPUs can subsequently communicate with each other to compute a statistic of the gradients (e.g., average, a maximum or a minimum), and apply the statistic (e.g. an average gradient) to obtain updated parameters. The neural network model may have a large number of parameters (e.g., billions of parameters) and each parameter may be associated with a gradient value. As such, the size of the gradients can be huge for the neural network, and transferring the gradients between the GPUs can take a tremendous amount of bandwidth.

Referring back to FIGS. 2A-2F, the example process illustrates an algorithm for reducing bandwidth requirement for data transfer among the GPUs. In one embodiment, bandwidth as used herein is the maximum rate of data transfer across a given network connection. The algorithm can include two processes. The first process is a Scatter-Reduce process and the second process is an Allgather process. During the Scatter-Produce process, the GPUs can exchange data such that every GPU ends up with a chunk of the final result. During the Allgather process, the GPUs can exchange those chunks such that all GPUs end up with the complete final result.

Each GPU can include one or more applications configured to partition the subset of training dataset on that GPU into the equal-sized data chunks; the number of the data chunks on each GPU is the number of the GPUs in the example system. Each data chunks can generate its own set of gradients during the training of the neural network model.

In this example, as shown above, since there are three GPUs in the system, and accordingly, the number of data chunks on each GPU is three. From the subset of the training data on GPU #0 203, three sets of gradients $a_0$ 215, $b_0$ 231, $c_0$ 237 can be generated; from the subset of the training data on GPU #1 205, three sets of gradients $a_1$ 217, $b_1$ 233, $c_1$ 239 are also generated. Similarly, from the subset of the training data on GPU #2 207, three sets of gradients $a_2$ 219, $b_2$ 235, $c_2$ 241 are generated. In one embodiment, the different sets of gradients on each GPU can be stored in an array or another data structure.

As an illustration, the algorithm is designed to sum up the gradients generated by each subset of the training dataset, such that upon the completion of the algorithm each GPU will have the sums of the gradients generated from the training dataset.

The GPUs in the example process can have a N–1 iterations during the Scatter-Reduce process, where N is the total number of GPUs in the system. As such, the GPUs in the example system can have 2 iterations. In each iteration, each GPU can send a set of gradients on the GPU to its right neighbor, receive a set of gradients from its left neighbor, and add up the two sets of gradients to generate a new set of gradients. The set of gradients being sent and received by every GPU is different for each iteration; the nth GPU starts by sending the nth set of gradients, and receives the (n–1)th set of gradients, and then proceeds backwards from there.

Figure 2A:
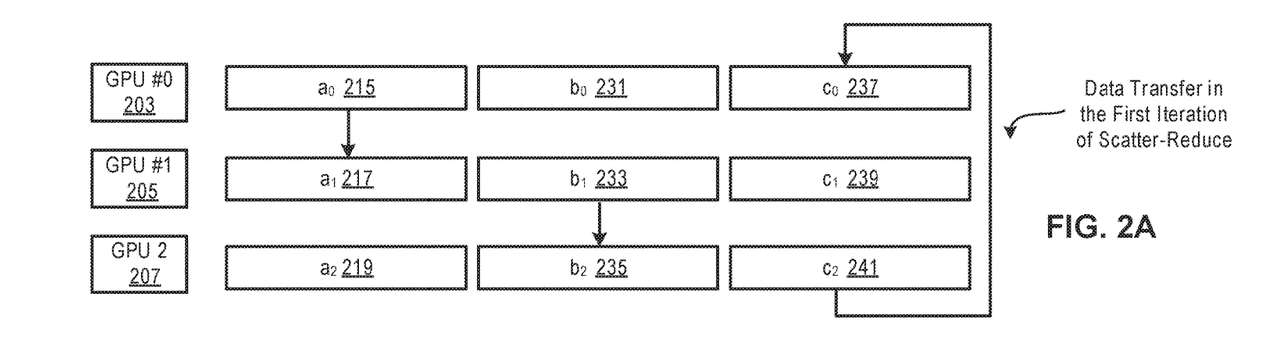
FIGS. 2A-2F illustrate an example process of data transfer in AI model training in accordance with an embodiment.
Figure 2B:
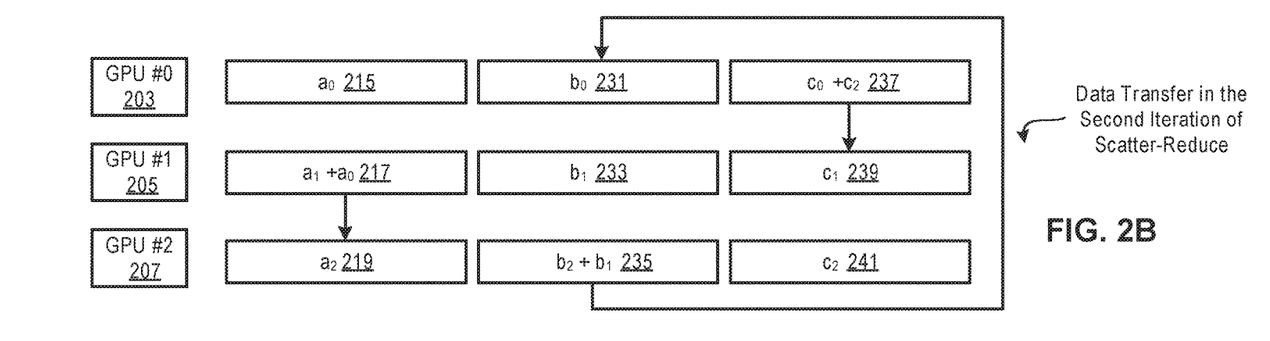
Figure 2C:
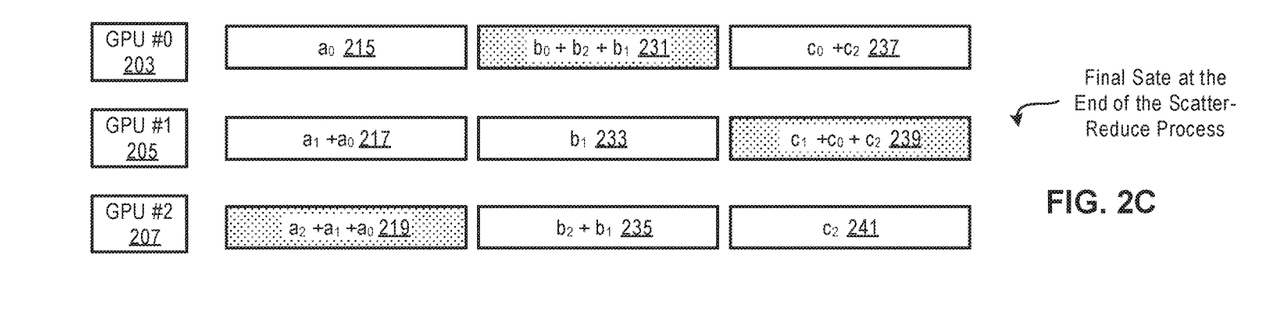

FIGS. 2A-2C illustrate the Scatter-Reduce process. FIG. 2A illustrates data transfer in the first iteration of the Scatter-Reduce process. After the first send and receive is completed, each GPU will have an array element with a value representing the sum of two sets of gradients on two different GPUs. For example, the first element $a_1$ on the GPU 205 can include the sum of the sets of gradients from the second GPU 205 and the first GPU 215. FIG. 2B illustrates data transfer in the second iteration of the Scatter-Reduce process, and also shows the intermediate sums after the first iteration of the Scatter-Reduce process is complete. In the second iteration, the Scatter-Reduce process continues, and by the end of the Scatter-Reduce process (namely after the second iteration in this example), each GPU will have one array element that contains the sum of all gradients in corresponding array elements across all the GPUs. FIG. 2C illustrates a final state at the end of the Scatter-Reduce process.

Figure 2D:
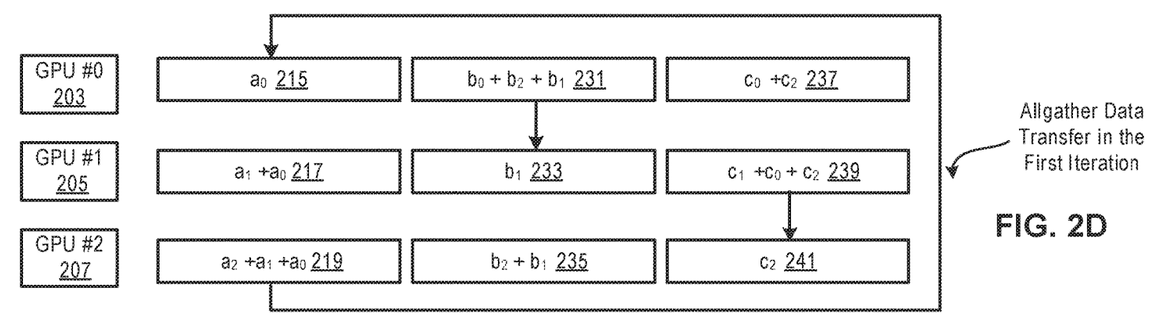
Figure 2E:
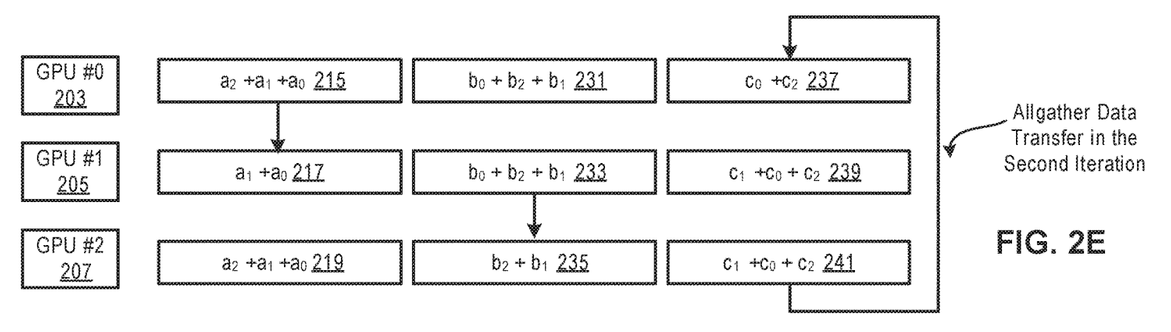
Figure 2F:
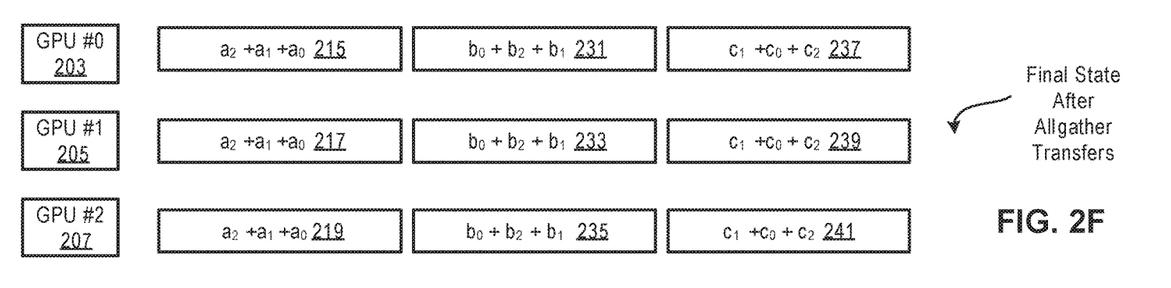

FIGS. 2D-2F illustrate the Allgather process, which proceeds identically to the Scatter-Reduce and also have N–1 iterations, except instead of accumulating gradients that the GPUs receive, the received gradients overwrite the gradients in a corresponding array element on the receiving GPU. FIG. 2D illustrates data transfer in the first iteration of the Allgather process. After the first iteration is completed, each GPU will have two array elements that each contains the sum of all gradients in corresponding array elements across all the GPUs, as shown in FIG. 2E. FIG. 2E shows the Allgather process in the second iteration, namely, the final iterations in the example process. By the end of the Allgather process as shown in FIG. 2F, GPU will have the fully accumulated gradients from the entire training dataset. Since all the data transfers occur synchronously in discrete iterations, the example process is bandwidth-optimal.

Figure 3:
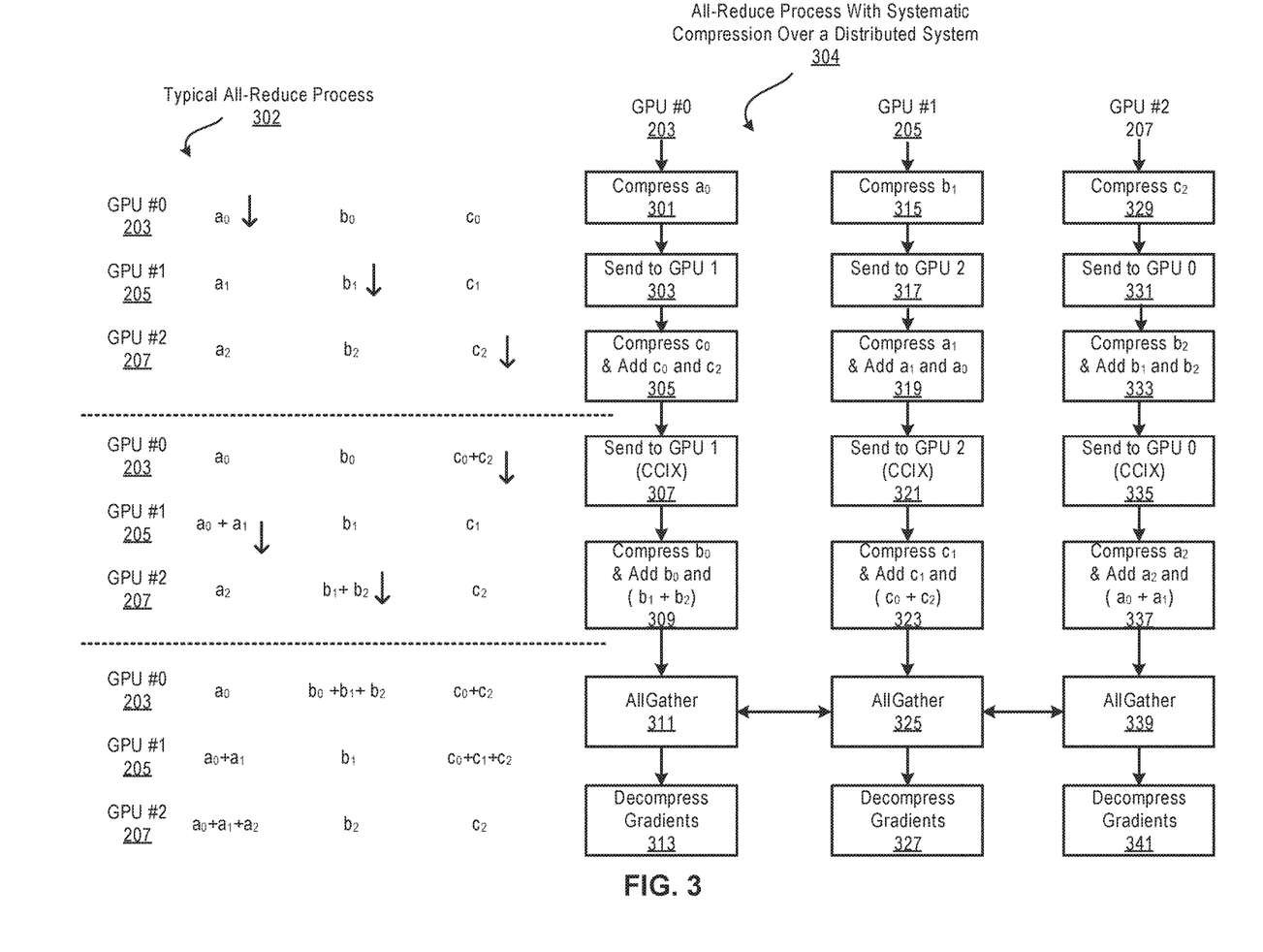
FIG. 3 illustrates an example process that represents an improvement over the process in FIGS. 2A-2F.

FIG. 3 illustrates an example process that represents an improvement over the process in FIGS. 2A-2F. In one embodiment, the example process shown in FIG. 3 can be used for transferring gradients for updating neural network parameters during the training of the neural network model, where tens of megabytes of data may need to be transferred in between distributed servers and operated collaboratively. This requires highly efficient hardware and software to improve the performance and latency.

In one embodiment, the example process leverages the All-Reduce algorithm and software and hardware co-design to improve both performance and latency. The software and hardware co-design refers to the simultaneous design of both hardware and software to achieve a desire function. The example process uses hardware components such as Cache Coherent Interconnect for Accelerators (CCIX) for connecting GPUs in a cluster, and software modules such as zero-value compression modules and other compression modules for enabling hardware computing based on compressed data. The example process uses systematic data compression over a distributed system designed to execute a highly efficient All-Reduce process. Therefore, gradients generated from different subsets of a training dataset can be accumulated and distributed to each GPU faster, thus accelerating AI model training.

In FIG. 3, the left part shows a typical All-Reduce process 302, which has been detailed in FIGS. 2A-2F; while the right part describes an improved All-Reduce process 304 with systematic compression over a distributed system. FIG. 3 uses three GPUs as an example, and the three GPUs are arranged to create a logical ring.

In both the typical All-Reduce Process 302 and the improved All-Reduce Process 304, data blocks to be transferred among the CPUs are stored in a data structure (e.g., an array), and the data blocks can be gradients generated from different chunks of a subset of a training dataset for training a neural network model. Each GPU can have a complete copy of the neural network model to be trained. The gradients are transferred among the GPUs for updating parameters of the neural network model.

In one embodiment, during the first iteration or first processing cycle of the Scatter-Reduce process, data blocks on each GPU can be compressed by a compression module, which can be implemented on hardware or as a software module. For example, data block $a_0$ on GPU #0 203, data block $b_1$ on GPU #1 205, and, data block $c_2$ in GPU #2 207 are all compressed respectively in operations 301, 315 and 329.

The compressed data blocks can be sent to the neighbor GPUs in a next processing cycle. For example, the compressed data block on GPU #0 203 can be sent to GPU #1 205 in operation 303, the compressed data block on GPU #1 205 can be sent to GPU #2 207 in operation 317, and the compressed data block on GPU #2 207 can be sent to GPU #0 203 in operation 331.

In one embodiment, at the same time that the compressed data blocks are sent to the neighbor GPUs, a different block of data on each GPU can be compressed and added to a compressed data received as described above. In this example embodiment, the operation of addition is used as an example; other operations (e.g., multiplication, deduction, and mathematical averaging) can also be used.

For example, in operation 305, the data block $c_0$ on GPU #0 203 can be compressed, and added to the compressed data block $c_2$, which has been received from GPU #2 205. In operation 319, the data block $a_1$ on GPU #1 205 can be compressed and added to the compressed data block $a_0$, which has been received from GPU #0. In operation 333, the data block $b_2$ on GPU #2 can be compressed can added to the compressed data block $b_1$, which has been received from GPU #0 203.

The above process can be repeated for each remaining iteration of the Scatter-Reduce process. The number of iterations can be the number of GPUs minus 1. As such, the Scatter-Reduce process in the improved All-Reduce process 304 can have 2 iterations. In each of the remaining iterations, each GPU, instead of sending the original compressed data block on the GPU, can send the sum of compressed data blocks from multiple GPUs to the next GPU.

For example, during the second iteration, GPU #0 203 can send the sum of the compressed data block co and the compressed data block $c_2$ to GPU #1 205 in operation 307. GPU #1 205 can send the sum of the compressed data block $a_0$ and the compressed data block $a_1$ to GPU #2 207 in operation 321. GPU #2 207 can send the sum of the compressed data block bi and the compressed data block $b_2$ to GPU #0 203 in operation 335.

In one embodiment, at the same time that the sums of the compressed data blocks are sent to the neighbor GPUs, each GPU can compress the remaining data block on the GPU and added the compressed data block to the sum of compressed data blocks previously received from a prior GPU in the logic ring. For example, in operation 309, the data block $b_0$ on GPU #0 202 can be compressed and added to the sum of the compressed data blocks $b_1$ and $b_2$. In operation 323, the data block $c_1$ on GPU #1 205 can be compressed and added to the sum of the compressed data blocks $c_0$ and $c_2$. In operation 337, the data block $a_2$ on GPU #2 207 can be compressed and added to the sum of the compressed data blocks $a_0$ and $a_1$.

Therefore, at the end of the Scatter-Reduce process, each GPU will have a sum of compressed data blocks from corresponding positions in the arrays across all the GPUs in the example process.

During the Allgather process, which comprises three operations 311, 325, and 339 each GPU can distribute the sum of the compressed data blocks from the corresponding positions in the array to each other GPU such that by the end of the Allgather process, each GPU will have a copy of the sum of all compressed data blocks. Each GPU can then decompress the compressed sum as shown in operations 313, 327 and 341. The decompressed sum on each GPU can be used to update the parameters of the copy of the neural network model on that GPU.

Figure 4:
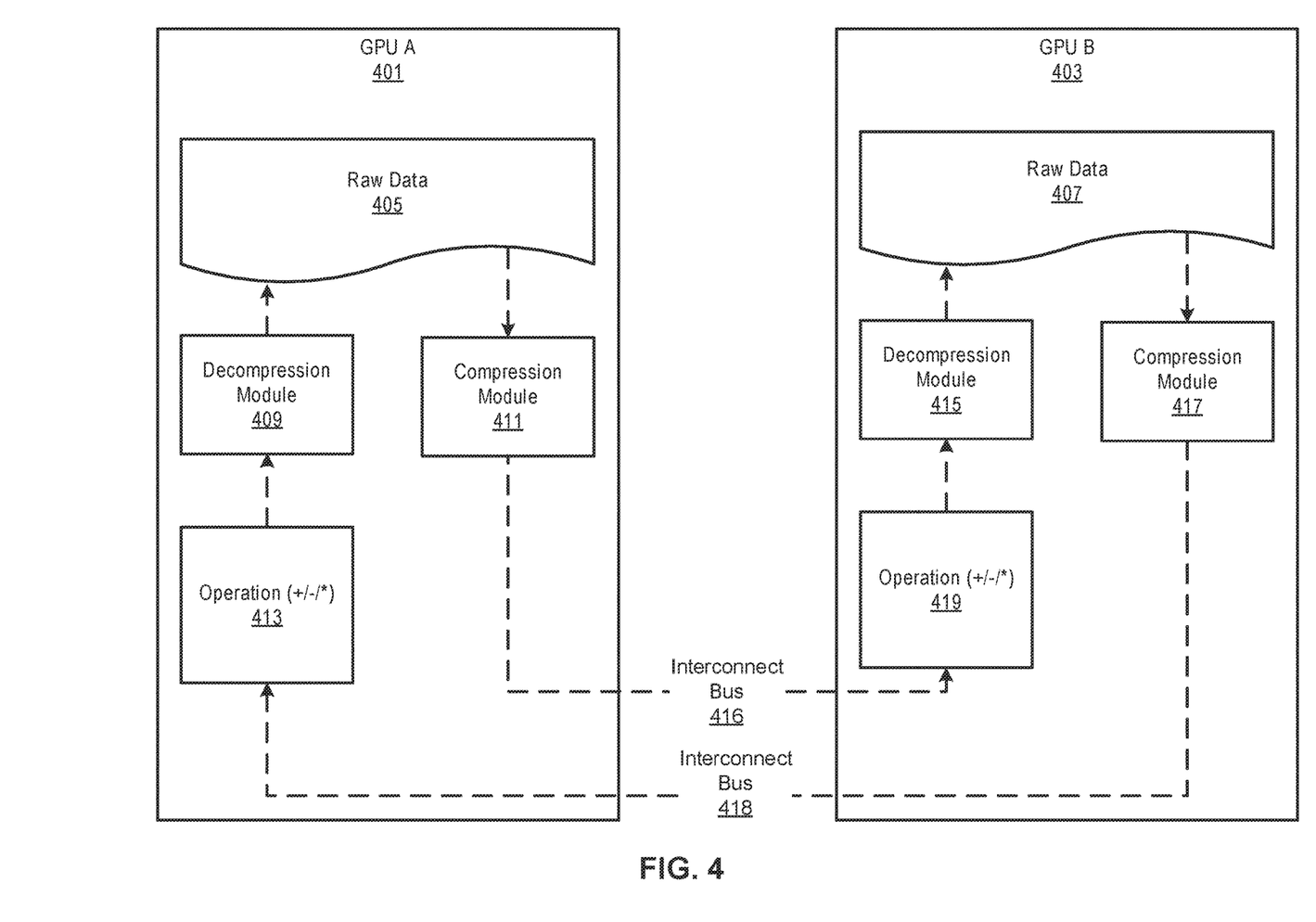
FIG. 4 illustrates an example architecture of data compress, data operation and interconnect buses in accordance with an embodiment.

FIG. 4 illustrates an example architecture of data compress, data operation and interconnect buses in accordance with an embodiment.

The diagram in FIG. 4 illustrates a data flow of compressing raw data blocks 405 and 407, and transferring the compressed data blocks over interconnect buses 416 and 418, operate 413 and 419 over compressed data and de-compress the compressed data to raw data.

As shown in FIG. 4, a pair of compression module and decompression module can be used on each GPU. For example, on GPU A 401, a compression module 412 and a decompression module 409 are used, and on GPU B 403, a compression module 417 and a decompression module 415 are used.

For the compression modules 412 and 417, any compression algorithm can be used. An example compression algorithm is a zero-value compression algorithm/technique, which is described in detailed below in the disclosure. Given a zero-value ratio of 50%, the bandwidth saving for data transfer can be close to 50% using the zero-value compression algorithm; when combined with various operations on the compressed data and interconnect buses, the bandwidth benefit can be more than 50%.

Figure 5:
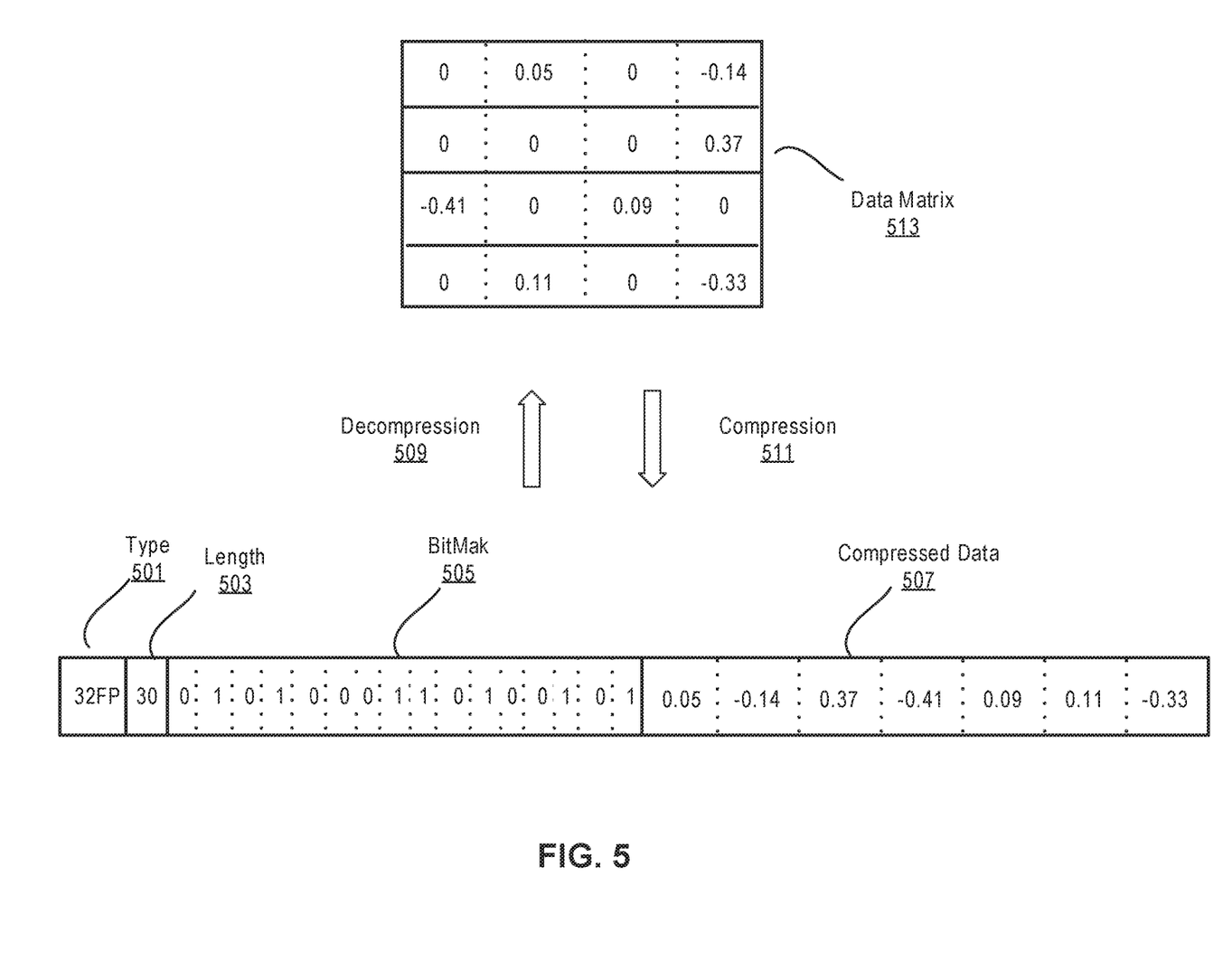
FIG. 5 illustrates a zero-sum compression technique in accordance with an embodiment.

FIG. 5 illustrates a zero-sum compression technique in accordance with an embodiment. In FIG. 5, a matrix 513 is an original 4×4 data array used for the training of a neural network model. A data structure 510 shows a compressed form of the matrix 513 using the zero-value compression technique. The data structure 510 includes a number of fields, for example, a type field 501, a length field 503, a bitmask field 505 and a compressed data field 507. The matrix 513 and the data structure 510 can be converted into each other using compression 511 and decompression 509.

In one embodiment, the type field 501 indicates the data type of values in the matrix 415. Examples of data types can include floating points (FP) 32, FP 16, and Integer (INT) 8. The length indicates the total size of the bitmask field 505 and the compressed data field 507 in bytes; or the size of the compressed data field 507 with the fixed size of bitmask byes. The bitmask field 505 field indicates a non-zero value in a particular position in the matrix 513 with '1" set, and a zero-value with '0' set. The compressed data 507 field includes only non-zero value data with the right alignment/offset. The bitmask field can also be used by a decompression module (e.g., the decompression module 409 or 415 in FIG. 4) to write the non-zero values in back to their original positions in the 4×4 data array 513.

Figure 6:
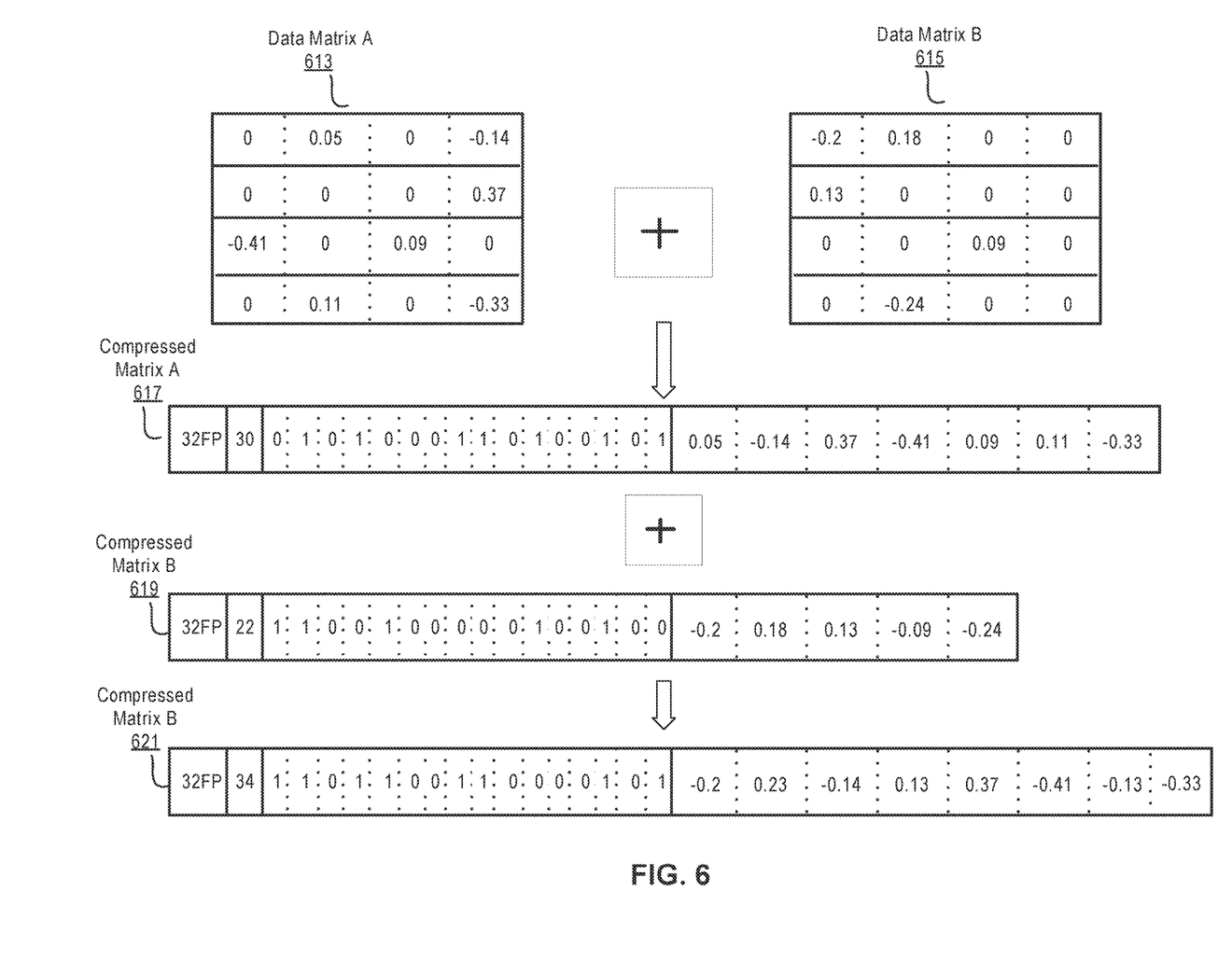
FIG. 6 illustrates an example operation on compressed data in accordance with an embodiment.

FIG. 6 illustrates an example operation on compressed data in accordance with an embodiment. As shown in FIG. 6, a summation operation is provided as an example to illustrate how an operation is conducted on two compressed data blocks.

In one embodiment, compressed data 617 is a data structure representing matrix A 613 in its compressed form, and compressed data 619 is a data structure representing matrix B 615 in its compressed form. Both structures are generated using the compression technique described in FIG. 5, and can be respectively decompressed to matrix A 613 and matrix B 615 using a decompression module (e.g., the decompression module 409 or 415).

In one embodiment, to sum the two compressed matrixes 613 and 615 in their compressed forms, a hardware compression module (e.g., compression module 411 or 417 in FIG. 4) can first pipeline the two compressed data structures 617 and 619, compare the bits in the bitmask field in one data structure against the bits in the bitmask field of another data structure, and output a result 621 based on the comparison.

With the data transferred between GPUs in compressed form, bandwidth requirement for data transfer can be reduced. Further, compressed data blocks take less memory than their uncompressed forms, memory requirement for operations on the compressed data blocks may also be reduced, since less bits are read from memory and written to memory during the operations.

For example, a summation operation may require two reads and one write. Since the data read from memory and written to memory are in compressed form, memory requirement for the summation operation is reduced.

Figure 7:
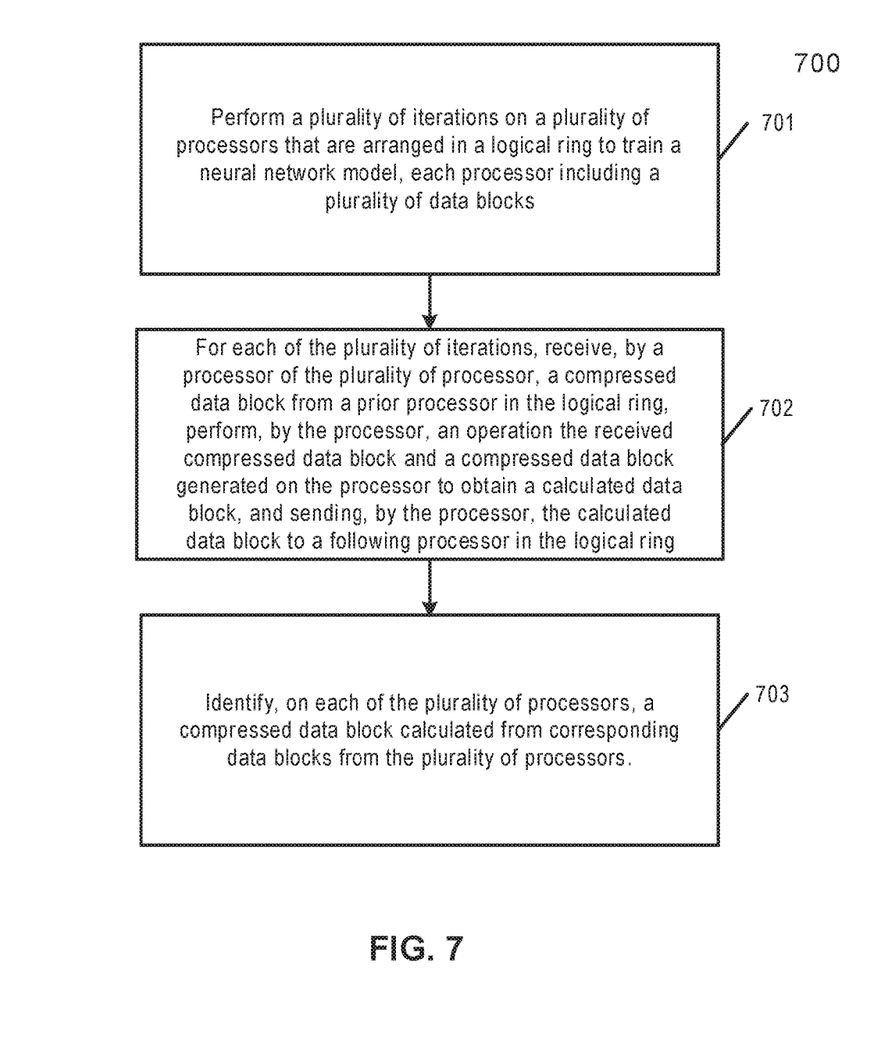
FIG. 7 illustrates an example process of AI model training in accordance with an embodiment.

FIG. 7 illustrates an example process 700 of AI model training in accordance with an embodiment. Process 700 may be performed by processing logic which may include software, hardware, or a combination thereof.

Referring back to FIG. 7, in operation 701, a plurality of iterations are performed on a plurality of processors that are arranged in a logical ring to train a neural network model, with each processor including a plurality of data blocks. In operation 702, for each of the plurality of iterations, a processor in the plurality of processors receives a compressed data block from a prior processor in the logical ring, performs an operation on the received compressed data block and a compressed data block generated on the processor to obtain a calculated data block, and sends the calculated data block to a following processor in the logical ring. In operation 703, a compressed data block that is calculated from corresponding data blocks from the plurality of processors is identified on each of the plurality of processors. The identified data block is distributed to each other processor and decompressed therein for use in the AI model training, for example, updating parameters of a neural network model.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

All of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of artificial intelligence (AI) model training using data processing (DP) accelerators, the method comprising:
   receiving a request from a central processing unit (CPU) for training an AI model based on a set of training data distributed across a plurality of general-purpose processing units (GPUs) that are arranged in a logical ring to train the AI model, wherein each of the plurality of GPUs includes a subset of the set of training data, a hardware compression module, and a hardware decompression module;
   generating, from the subset of the set of training data on the GPU, a plurality of data blocks representing gradients for updating parameters of the AI model;
   performing, by each of the plurality of GPUs concurrently, a plurality of DP iterations, including for each of the plurality of DP iterations:
   performing a compression operation on one of the plurality of data blocks on the GPU using the hardware compression module on the GPU to generate a first compressed data block,
   receiving, by the GPU, a second compressed data block from an upstream GPU of the plurality of GPUs in the logical ring, wherein the second compressed data block is generated by the hardware compression module on the upstream GPU,
   combining, by the GPU, the first compressed data block and the second compressed data block to generate a first respective DP result, and
   transmitting, by the GPU, the first respective DP result to a downstream GPU of the plurality of GPUs in the logical ring via an inter-processor link;
   wherein, upon a completion of the plurality of DP iterations, the GPU includes a compressed copy that represents a combination of compressed data blocks from the plurality of GPUs, wherein each compressed data block corresponds to one of the plurality of data blocks from one of the plurality of GPUs, and is generated by the hardware compression module on that GPU; and
   decompressing, by the GPU, the compressed copy using the hardware decompression module on the GPU.

2. The method of claim 1, wherein the inter-processor link comprises a Cache Coherent Interconnect for Accelerators (CCIX) connection.

3. The method of claim 1, wherein the compressing of the first data block includes using a zero-value compression algorithm, which compresses the first data blocks into a data structure having a bitmask section and a compressed data section, wherein the bitmask section includes bits indicating positions in the data blocks having non-zero values.

4. The method of claim 1, wherein each subset of the set of training data is divided into a plurality of data chunks, wherein a number of the plurality of data chunks is equal to a number of the plurality of GPUs in the logical ring, and wherein each of the plurality of data blocks representing the gradients is generated from one of the plurality of data chunks.

5. The method of claim 1, wherein each of the plurality of GPUs has a complete copy of the AI model.

6. A data processing system, comprising:
at least one central processing unit (CPU); and
a plurality of general-purpose processing units (GPUs) coupled to the CPU, wherein each of the GPUs is configured to perform artificial intelligence (AI) data processing (DP) operations distributed from the CPU, the operations including:
receiving a request from a central processing unit (CPU) for training an AI model based on a set of training data distributed across a plurality of general-purpose processing units (GPUs) that are arranged in a logical ring to train the AI model, wherein each of the plurality of GPUs includes a subset of the set of training data, a hardware compression module, and a hardware decompression module,
generating, from the subset of the set of training data on the GPU, a plurality of data blocks representing gradients for updating parameters of the AI model,
performing, by each of the plurality of GPUs concurrently, a plurality of DP iterations, including for each of the DP iterations:
performing a compression operation on one of the plurality of data blocks on the GPU using the hardware compression module on the GPU to generate a first compressed data block,
receiving, by the GPU, a second compressed data block from an upstream GPU of the plurality of GPUs in the logical ring, wherein the second compressed data block is generated by the hardware compression module on the upstream GPU,
combining, by the GPU, the first compressed data block and the second compressed data block to generate a first respective DP result, and
transmitting, by the GPU, the first respective DP result to a downstream GPU of the plurality of GPUs in the logical ring via an inter-processor link;
wherein, upon a completion of the plurality of DP iterations, the GPU includes a compressed copy that represents a combination of compressed data blocks from the plurality of GPUs, wherein each compressed data block corresponds to one of the plurality of data blocks from one of the plurality of GPUs, and is generated by the hardware compression module on that GPU; and
decompressing, by the GPU, the compressed copy using the hardware decompression module on the GPU.

7. The system of claim 6, wherein each subset of the set of training data is divided into a plurality of data chunks, wherein a number of the plurality of data chunks is equal to a number of the plurality of GPUs in the logical ring, and wherein each of the plurality of data blocks representing the gradients is generated from one of the plurality of data chunks.

8. The system of claim 6, wherein the inter-processor link comprises a Cache Coherent Interconnect for Accelerators (CCIX) connection.

9. The system of claim 6, wherein the compressing of the first data block includes using a zero-value compression algorithm, which compresses the first data blocks into a data structure having a bitmask section and a compressed data section, wherein the bitmask section includes bits indicating positions in the data blocks having non-zero values.

10. A non-transitory machine-readable medium having instructions stored therein, which when executed by a processor, cause the processor to perform operations for artificial intelligence (AI) training, the operations comprising:
receiving a request from a central processing unit (CPU) for training an AI model based on a set of training data distributed across a plurality of DP iterations by a plurality of general-purpose processing units (GPUs) that are arranged in a logical ring to train the AI model, wherein each of the plurality of GPUs includes a subset of the set of training data, and a hardware compression module and a hardware decompression module;
generating, from the subset of the set of training data on the GPU, a plurality of data blocks representing gradients for updating parameters of the AI model;
performing, by each of the plurality of GPUs concurrently, a plurality of DP iterations, including for each of the plurality of DP iterations:
performing a compression operation on one of the plurality of data blocks using the hardware compression module on that GPU to generate a first compressed data block,
receiving, by the GPU, a second compressed data block from an upstream GPU of the plurality of GPUs in the logical ring, wherein the second compressed data block is generated by the hardware compression module on the upstream GPU,
combining, by the GPU, the first compressed data block and the second compressed data block to generate a first respective DP result,
transmitting, by the GPU, the first respective DP result to a downstream GPU of the plurality of GPUs in the logical ring via an inter-processor link;
wherein, upon a completion of the plurality of DP iterations, the GPU includes a compressed copy that represents a combination of compressed data blocks from the plurality of GPUs, wherein each compressed data block corresponds to one of the plurality of data blocks from one of the plurality of GPUs, and is generated by the hardware compression module on that GPU; and
decompressing, by the GPU, the compressed copy using the hardware decompression module on the GPU.

11. The non-transitory machine-readable medium of claim 10, wherein upon a completion of the plurality of DP iterations, the GPU includes a compressed copy of at least one data block of the plurality of data blocks from each of the plurality of GPUs.

12. The non-transitory machine-readable medium of claim 11, the operations further comprising:
decompressing, by the GPU, the compressed copy using a hardware decompression module on the GPU.

13. The non-transitory machine-readable medium of claim 10, wherein the inter-processor link comprises a Cache Coherent Interconnect for Accelerators (CCIX) connection.

14. The non-transitory machine-readable medium of claim 10, wherein the compressing of the first data block includes using a zero-value compression algorithm, which compresses the first data blocks into a data structure having a bitmask section and a compressed data section, wherein the bitmask section includes bits indicating positions in the data blocks having non-zero values.

16. The non-transitory machine-readable medium of claim 10, wherein each subset of the set of training data is divided into a plurality of data chunks, wherein a number of the plurality of data chunks is equal to a number of the plurality of GPUs in the logical ring, and wherein each of the plurality of data blocks representing the gradients is generated from one of the plurality of data chunks.

16. The non-transitory machine-readable medium of claim 10, wherein each of the plurality of GPUs has a complete copy of the AI model.

* * * * *